United States Patent [19]
Meier et al.

[11] Patent Number: 6,147,790
[45] Date of Patent: Nov. 14, 2000

[54] SPRING-RING MICROMECHANICAL DEVICE

[75] Inventors: Robert E. Meier, Dallas; Richard L. Knipe, McKinney, both of Tex.

[73] Assignee: Texas Instruments Incorporated, Dallas, Tex.

[21] Appl. No.: 09/311,009

[22] Filed: May 13, 1999

Related U.S. Application Data

[60] Provisional application No. 60/087,732, Jun. 2, 1998.

[51] Int. Cl.⁷ ........................................................ G02B 26/00
[52] U.S. Cl. .......................... 359/291; 359/295; 359/846; 347/239; 73/514.35
[58] Field of Search ...................................... 359/290, 291, 359/295, 846, 850, 224, 871; 347/239; 73/514.35, 514.36

[56] References Cited

U.S. PATENT DOCUMENTS

| | | | |
|---|---|---|---|
| 5,061,049 | 10/1991 | Hornbeck | 359/224 |
| 5,111,693 | 5/1992 | Greiff | 73/514 |
| 5,583,688 | 12/1996 | Hornbeck | 359/291 |
| 5,600,383 | 2/1997 | Hoenbeck | 359/291 |
| 5,661,591 | 8/1997 | Lin et al. | 359/290 |
| 5,703,728 | 12/1997 | Smith et al. | 359/871 |
| 5,867,202 | 2/1999 | Knipe et al. | 347/239 |
| 5,886,811 | 3/1999 | Min | 359/291 |

FOREIGN PATENT DOCUMENTS

| | | |
|---|---|---|
| 0 602 538 A1 | 6/1994 | European Pat. Off. . |
| 0 783 124 A1 | 7/1997 | European Pat. Off. . |

*Primary Examiner*—Loha Ben
*Attorney, Agent, or Firm*—Charles A. Brill; Wade James Brady, III; Frederick J. Telecky, Jr.

[57] ABSTRACT

An improved micromechanical device comprising a substrate (104), a rigid deflectable member (302, 314, 326) suspended over the substrate, and at least one spring (328) supported above the substrate and spaced apart from the rigid deflectable member. The spring resists deflection of the rigid deflectable member when the rigid deflectable member deflects to contact the spring. The improved micromechanical device is constructed by fabricating at least one support structure (116) on a substrate, fabricating at least one spring spaced apart from the substrate and supported by at least one of the support structures, and fabricating a deflectable member spaced apart from both the substrate and spring, and supported by at least one of the support structures. The improved micromechanical device is useful in a projection display system in which a micromirror device selectively reflects incident light, as directed by a controller electrically connected to the micromirror device, and the selectively reflected light is focused onto an image plane. The micromirror device is comprised an array of micromirror elements, each comprised of: a substrate, a spring supported by the substrate, and a deflectable rigid member supported by the substrate and spaced apart from the spring. The deflectable rigid member including a mirror to deflect toward the spring, which resists the deflection of the deflectable rigid member.

27 Claims, 12 Drawing Sheets

SPRING-RING MICROMECHANICAL DEVICE

CROSS-REFERENCE TO RELATED APPLICATIONS

This application claims priority under 35 USC § 119(e)(1) of provisional application Ser. No. 60/087,732 filed Jun. 2, 1998.

The following patents and/or commonly assigned patent applications are hereby incorporated herein by reference:

| Patent No. | Filing Date | Issue Date | Title |
| --- | --- | --- | --- |
| 5,061,049 | Sept. 13, 1990 | Oct. 29, 1991 | Spatial Light Modulator and Method |
| 5,583,688 | Dec. 21, 1993 | Dec. 10, 1996 | Multi-Level Digital Micromirror Device |
| 5,867,202 | Dec. 13, 1996 | Feb. 2, 1999 | Micromechanical Devices with Spring Tips |

FIELD OF THE INVENTION

This invention relates to the field of micromechanical devices, more particularly to micromechanical devices having a deflectable member, more particularly to digital micromirror devices.

BACKGROUND OF THE INVENTION

Micromechanical devices are small structures typically fabricated on a semiconductor wafer using techniques such as optical lithography, doping, metal sputtering, oxide deposition, and plasma etching which have been developed for the fabrication of integrated circuits.

Digital micromirror devices (DMDs), sometimes referred to as deformable micromirror devices, are a type of micromechanical device. Other types of micromechanical devices include accelerometers, pressure and flow sensors, gears and motors. While some micromechanical devices, such as pressure sensors, flow sensors, and DMDs have found commercial success, other types have not yet been commercially viable.

Digital micromirror devices are primarily used in optical display systems. In display systems, the DMD is a light modulator that uses digital image data to modulate a beam of light by selectively reflecting portions of the beam of light to a display screen. While analog modes of operation are possible, DMDs typically operate in a digital bistable mode of operation and as such are the core of the first true digital full-color image projection systems.

Micromirrors have evolved rapidly over the past ten to fifteen years. Early devices used a deformable reflective membrane which, when electrostatically attracted to an underlying address electrode, dimpled toward the address electrode. Schieren optics illuminate the membrane and create an image from the light scattered by the dimpled portions of the membrane. Schlieren systems enabled the membrane devices to form images, but the images formed were very dim and had low contrast ratios, making them unsuitable for most image display applications.

Later micromirror devices used flaps or diving board-shaped cantilever beams of silicon or aluminum, coupled with dark-field optics to create images having improved contrast ratios. Flap and cantilever beam devices typically used a single metal layer to form the top reflective layer of the device. This single metal layer tended to deform over a large region, however, which scattered light impinging on the deformed portion. Torsion beam devices use a thin metal layer to form a torsion beam, which is referred to as a hinge, and a thicker metal layer to form a rigid member, or beam, typically having a mirror-like surface: concentrating the deformation on a relatively small portion of the DMD surface. The rigid mirror remains flat while the hinges deform, minimizing the amount of light scattered by the device and improving the contrast ratio of the device.

Recent micromirror configurations, called hidden-hinge designs, further improve the image contrast ratio by fabricating a mirror over the torsion beams. The elevated mirror blocks incident light from striking the torsion beams, torsion beam supports, and a rigid yoke connecting the torsion beams and mirror support. These support structures, along with the address electrodes and mirror bias/reset metalization on the device substrate, all tend to scatter light striking them. This scattered light reaches the image screen and reduces the contrast ratio of the projected image. The hidden-hinge micromirror design improves the contrast ratio of the images by preventing most light from reaching these support structures.

Elevating the micromirror above the torsion beams and their supports requires a support structure to space the micromirror above the torsion beams. Typically, a spacervia or support post is fabricated to perform this task. A spacervia is a hollow tube of metal formed by depositing metal into a hole in the sacrificial layer on which the mirror is fabricated. The hollow spacervia has an open top which decreases the surface area of the micromirror. Additionally, the open top of the spacervia is a sharp edge which diffracts incident light—lowering the contrast ratio of the projected image.

In addition to the need to improve the contrast ratio of the projected images, micromirror designers also strive to improve the reliability of the mirror reset—the act of returning the micromirror to a neutral position after it has been rotated to either the on or off position. Some micromirrors tend to stick to the landing sites due to a variety of forces such as the van der Waals force generated by water vapor present on the device surface and intermetallic bonding. A technique called dynamic reset uses voltage pulses to excite the dynamic response of the micromirror and torsion beams causing the mirror to spring away from the landing site and back to a neutral position.

Unfortunately, the magnitude of the force sticking the mirrors to the landing sites varies over a wide range. Mirrors that are stuck to the landing sites only weakly often release from the landing site after a single reset pulse, while other mirrors may require several pulses before storing sufficient energy to release from the landing site. Prematurely released mirrors cause several problems. First, a prematurely released micromirror may land during the remainder of the dynamic reset period. If the prematurely released micromirror lands late enough in the dynamic reset period, the mirror will not be able to store enough energy from the reset pulses to release from the landing site a second time. Second, the prematurely released micromirror may tend to flutter about the axis of the torsion beams. If the mirror bias voltage is reapplied while the fluttering mirror is rotated toward the wrong address electrode, the mirror will be electrostatically latched to the wrong address electrode—causing an intermittent twinkling of dark pixels.

Therefore, there is a need for a micromirror device design which improves the contrast ratio of the projected image and also improves the reliability of the micromirror reset operation.

SUMMARY OF THE INVENTION

Objects and advantages will be obvious, and will in part appear hereinafter and will be accomplished by the present invention which provides a method and system for a micromechanical having a spring-based return structure and method of fabrication. One embodiment of the claimed invention provides an improved micromechanical device comprising a substrate, a rigid deflectable member suspended over the substrate, and at least one spring supported above the substrate and spaced apart from the rigid deflectable member. The spring operable to resist deflection of the rigid deflectable member when the rigid deflectable member deflects to contact the spring.

According to another embodiment of the disclosed invention, a method of fabricating an improved micromechanical device is provided. The method comprises the steps of fabricating at least one support structure on a substrate, fabricating at least one spring spaced apart from the substrate and supported by at least one of the support structures, and fabricating a deflectable member spaced apart from the substrate and the spring and supported by at least one of the support structures. The deflectable member is operable to move into contact with the spring, and the spring is operable to resist further movement of the deflectable member.

According to another embodiment of the invention, a display system is provided. The display system comprises: a light source capable of providing a light beam along a light path, a micromirror device on the light path, a controller electrically connected to the micromirror device, and projection optics located in a projection light path. The micromirror device is comprised of an array of micromirror elements. Each micromirror element is comprised of: a substrate, a spring supported by the substrate, and a deflectable rigid member supported by the substrate and spaced apart from the spring. The deflectable rigid member typically is a mirror disposed in the light path and operable to deflect toward the spring—which resists the deflection of the deflectable rigid member. The controller provides electrical signals to the micromirror device to cause the micromirror device to selectively deflect the deflectable rigid members. The selectively deflected rigid members selectively reflect light along a projection light path. The projection optics operable to focus light reflected by the micromirror device onto an image plane.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new micromirror device has been developed that simultaneously improves both the contrast ratio of a projected image and the reliability of the mirror reset operation. These improvements are achieved through the use of a spring located between the micromirror and the underlying substrate. Preferably the spring is metal, but various embodiments may utilize any resilient elastic member capable of storing energy upon contact with, and deformation by, a deflectable member. The spring resists the motion of the deflectable member upon contact between the deflectable member and the spring, contact which may be through an intermediate member.

Figure 1:
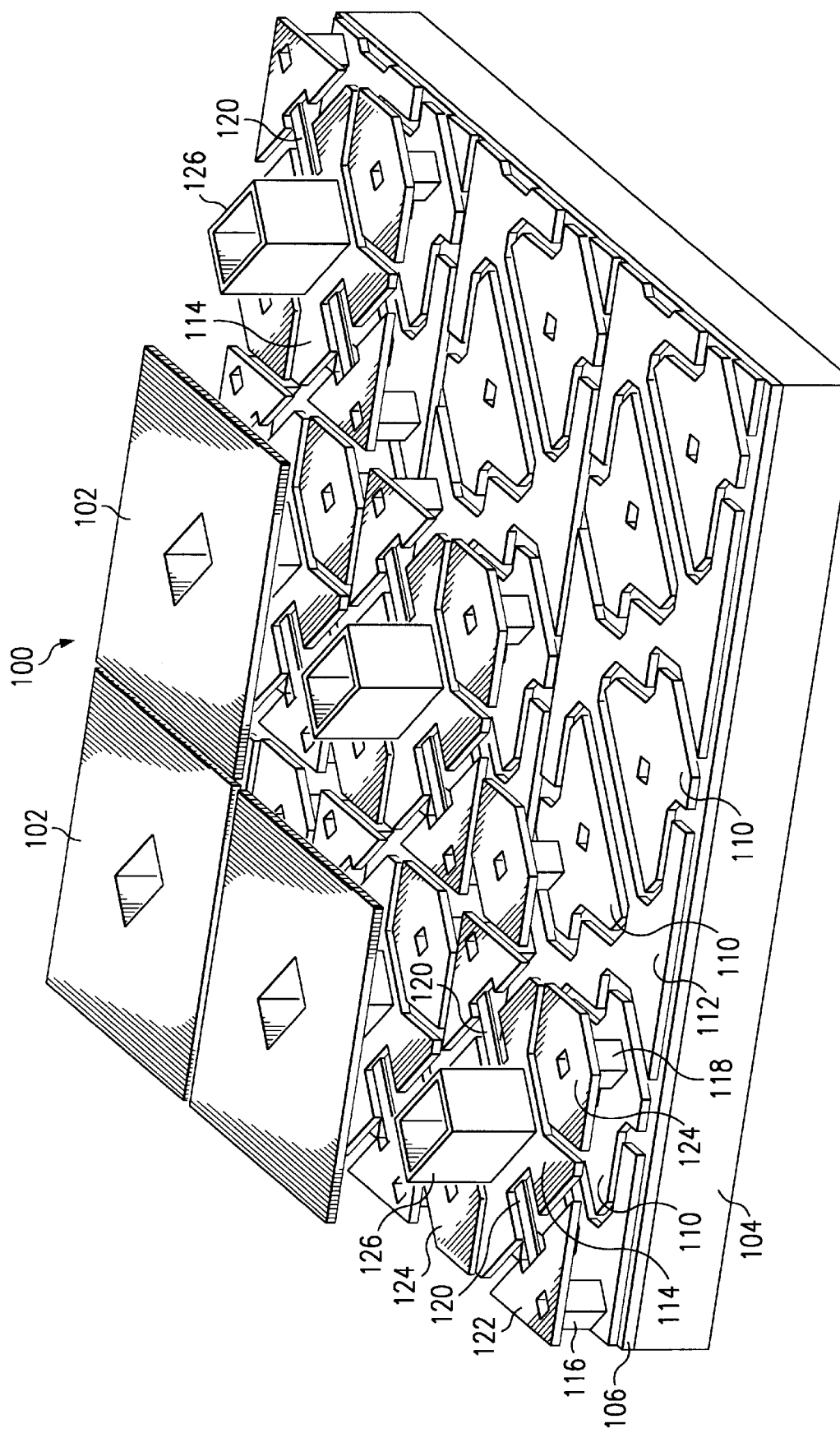
FIG. 1 is a perspective view of a small portion of a micromirror array of the prior art.
Figure 2:
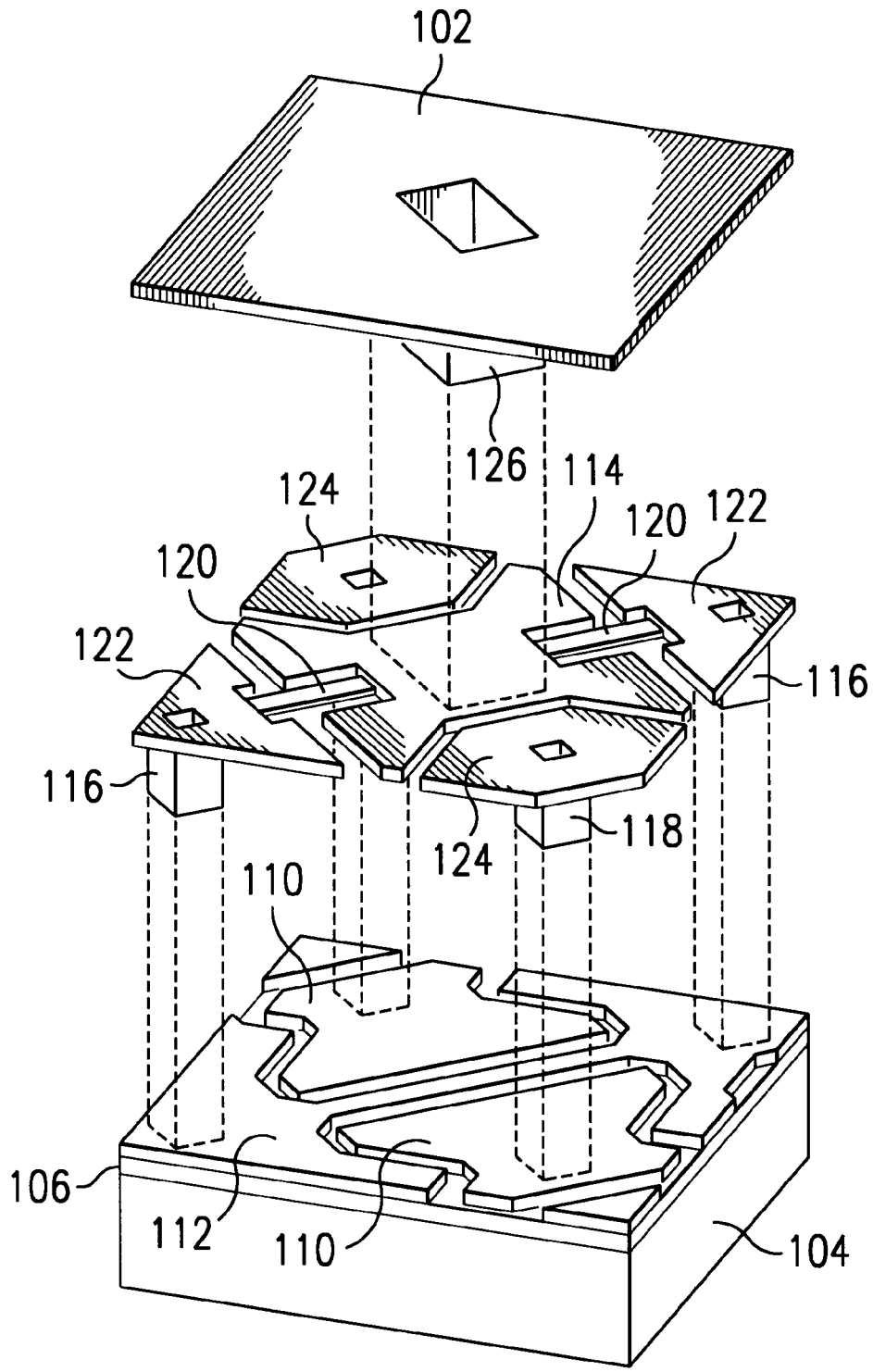
FIG. 2 is an exploded perspective view of a single micromirror element from the micromirror array of FIG. 1.

A typical hidden-hinge DMD 100 of the prior art is an orthogonal array of DMD cells, or elements. This array often includes more than a thousand rows and columns of DMD elements. FIG. 1 shows a small portion of a DMD array of the prior art with several mirrors 102 removed to show the underlying mechanical structure of the DMD array. FIG. 2 is an exploded view of a single DMD element of the prior art further detailing the relationships between the DMD structures.

A DMD is fabricated on a semiconductor, typically silicon, substrate 104. Electrical control circuitry is typically fabricated in or on the surface of the semiconductor substrate 104 using standard integrated circuit process flows. This circuitry typically includes, but is not limited to, a memory cell associated with, and typically underlying, each mirror 102, and digital logic circuitry to control the transfer of the digital image data to the underlying memory cells. Voltage driver circuits to drive bias and reset signals to the mirror superstructure may also be fabricated on the DMD substrate, or may be external to the DMD. Image processing and data formatting logic is also formed in the substrate 104 of some designs. For the purposes of this disclosure, addressing circuitry is considered to include any circuitry, including direct voltage connections and shared memory cells, used to control the direction of rotation of a DMD mirror.

Some DMD configurations use a split reset configuration which allows several DMD elements to share one memory cell. Split reset reduces the number of memory cells necessary to operate a very large array, and makes more room available for voltage driver and image processing circuitry on the DMD integrated circuit. Split reset is enabled by the bistable operation of a DMD, which allows the contents of the underlying memory to change without effecting the position of the mirror 102 when the mirror has a bias voltage applied.

The silicon substrate 104 and any necessary metal interconnection layers are isolated from the DMD superstructure by an insulating layer 106 which is typically a deposited silicon dioxide layer on which the DMD superstructure is formed. Holes, or vias, are opened in the oxide layer to allow electrical connection of the DMD superstructure with the electronic circuitry formed in the substrate 104.

The first layer of the DMD superstructure is a metalization layer, typically the third metalization layer and therefore often called M3. The first two metalization layers are typically required to interconnect the circuitry fabricated on the substrate. The third metalization layer is deposited on the insulating layer and patterned to form address electrodes 110 and a mirror bias/reset connection 112. Some micromirror designs have landing electrodes which are separate and distinct structures electrically connected to the mirror bias connection 112. For the purposes of this disclosure, landing structures such as landing electrodes will be considered part of the device substrate. Therefore, contact between a deflectable structure and a landing site on the substrate is considered contact between the deflectable structure and the substrate. Landing electrodes limit the rotation of the mirror 102 and prevent the rotated mirror 102 or hinge yoke 114 from touching the address electrodes 110, which have a voltage potential relative to the mirror 102. If the mirror 102 contacts the address electrodes 110, the resulting short circuit could fuse the torsion beam hinges 120 or weld the mirror 102 to the address electrodes 110—in either case ruining the DMD.

Since the same voltage is always applied both to the landing electrodes and the mirrors 102, the mirror bias connection and the landing electrodes are preferably combined in a single structure when possible. The landing electrodes are combined with the mirror bias connection 112 by including regions on the mirror bias connection or other regions of the substrate, called landing sites, to mechanically limit the rotation of the mirror 102 by contacting either the mirror 102 or the hinge yoke 114. These landing sites are often coated with a material chosen to reduce the tendency of the mirror 102 and torsion beam hinge yoke 114 to stick to the landing site.

Mirror bias/reset voltages travel to each mirror 102 through a combination of paths using both the mirror bias/reset metalization 112 and the mirrors and torsion beams of adjacent mirror elements. Split reset designs require the array of mirrors to be subdivided into multiple subarrays each having an independent mirror bias connection. The landing electrode/mirror bias 112 configuration shown in FIG. 1 is ideally suited to split reset applications since the DMD elements are easily segregated into electrically isolated rows or columns simply by isolating the mirror bias/reset layer between the subarrays. The mirror bias/reset metalization layer 112 of FIG. 1 is shown divided into rows of isolated mirrors.

A first layer of supports, typically called spacervias, is fabricated on the metal layer forming the address electrodes 110 and mirror bias connections 112. These spacervias, which include both torsion beam support spacervias 116 and upper address electrode spacervias 118, are typically formed by spinning a thin spacer layer over the address electrodes 110 and mirror bias connections 112. This thin spacer layer is typically a 1 $\mu$m thick layer of positive photoresist. After the photoresist layer is deposited, it is exposed, patterned, and deep UV hardened to form holes in which the spacervias will be formed. This spacer layer and a thicker spacer layer used later in the fabrication process are often called sacrificial layers since they are used only as forms during the fabrication process and are removed prior to device operation.

A thin layer of metal is sputtered onto the spacer layer and into the holes. An oxide is then deposited over the thin metal layer and patterned to form an etch mask over the regions that later will form hinges 120. A thicker layer of metal, typically an aluminum alloy, is sputtered over the thin layer and oxide etch masks. Another layer of oxide is deposited and patterned to define the hinge yoke 114, hinge cap 122, and the upper address electrodes 124. After this second oxide layer is patterned, the two metals layers are etched simultaneously and the oxide etch stops removed to leave thick rigid hinge yokes 114, hinge caps 122, and upper address electrodes 124 formed by both metal layers, and thin flexible torsion beams 120 formed by only the thin layer of torsion beam metal.

A thick spacer layer is then deposited over the thick metal layer and patterned to define holes in which mirror support spacervias 126 will be formed. The thick spacer layer is typically a 2 μm thick layer of positive photoresist. A layer of mirror metal, typically an aluminum alloy, is sputtered on the surface of the thick spacer layer and into the holes in the thick spacer layer. This metal layer is then patterned to form the mirrors 102. After the mirrors 102 are formed, both spacer layers are removed using a plasma etch.

Once the two spacer layers have been removed, the mirror is free to rotate about the axis formed by the torsion beam hinge 120. Electrostatic attraction between an address electrode 110 and a deflectable rigid member, which in effect form the two plates of an air gap capacitor, is used to rotate the mirror structure. Depending on the design of the micromirror device, the deflectable rigid member is the torsion beam yoke 114, the beam or mirror 102, a beam attached directly to the torsion beams, or a combination thereof The upper address electrodes 124 also electrostatically attract the deflectable rigid member.

The force created by the voltage potential is a function of the reciprocal of the distance between the two plates. As the rigid member rotates due to the electrostatic torque, the torsion beam hinges 120 deform and resist the rotation with a restoring torque which is an approximately linear function of the angular deflection of the torsion beams 120. The structure rotates until the restoring torsion beam torque equals the electrostatic torque, or until the rotation is mechanically blocked by contact between the rotating structure and the substrate—which includes landing sites or landing electrodes. As discussed below, most micromirror devices are operated in a digital mode wherein sufficiently large bias voltages are used to ensure full deflection of the micromirror superstructure.

Micromirror devices are generally operated in one of two modes of operation. The first mode of operation is an analog mode, sometimes called beam steering, in which the address electrode is charged to a voltage corresponding to the desired deflection of the mirror. Light striking the micromirror device is reflected by the mirror at an angle determined by the deflection of the mirror. Depending on the voltage applied to the address electrode, the cone of light reflected by an individual mirror is directed to fall outside the aperture of a projection lens, partially within the aperture, or completely within the aperture of the lens. The reflected light is focused by the lens onto an image plane, with each individual mirror corresponding to a fixed location on the image plane. As the cone of reflected light is moved from completely within the aperture to completely outside the aperture, the image location corresponding to the mirror dims, creating continuous brightness levels.

The second mode of operation is a digital mode. When operated digitally, each micromirror is fully deflected in either of the two directions about the torsion beam axis. Digital operation uses a relatively large voltage to ensure the mirror is fully deflected. While standard logic voltage levels are applied to the address electrodes, a larger bias voltage, typically positive 24 volts, is applied to the mirror metal layer. A sufficiently large mirror bias voltage—a voltage above what is termed the collapse voltage of the device—ensures the mirror will deflect to the closest landing electrodes even in the absence of an address voltage. Therefore, by using a large mirror bias voltage, the address voltages need only be large enough to deflect the mirror slightly.

To create an image using the micromirror device, the light source is positioned at an angle equal to twice the angle of rotation so that mirrors rotated toward the light source reflect light in a direction normal to the surface of the micromirror device and into the aperture of a projection lens—creating a bright pixel on the image plane. Mirrors rotated away from the light source reflect light away from the projection lens—leaving the corresponding pixel dark. Intermediate brightness levels are created by pulse width modulation techniques in which the mirror is rapidly rotated on and off. The duty cycle of the mirror determines the quantity of light reaching the image plane. The human eye integrates the light pulses and the brain perceives a flicker-free intermediate brightness level.

Full-color images are generated either by using three micromirror devices to produce three single-color images, or by sequentially forming three single-color images using a single micromirror device illuminated by a beam of light passing through three color filters mounted on a rotating color wheel.

Figure 3:
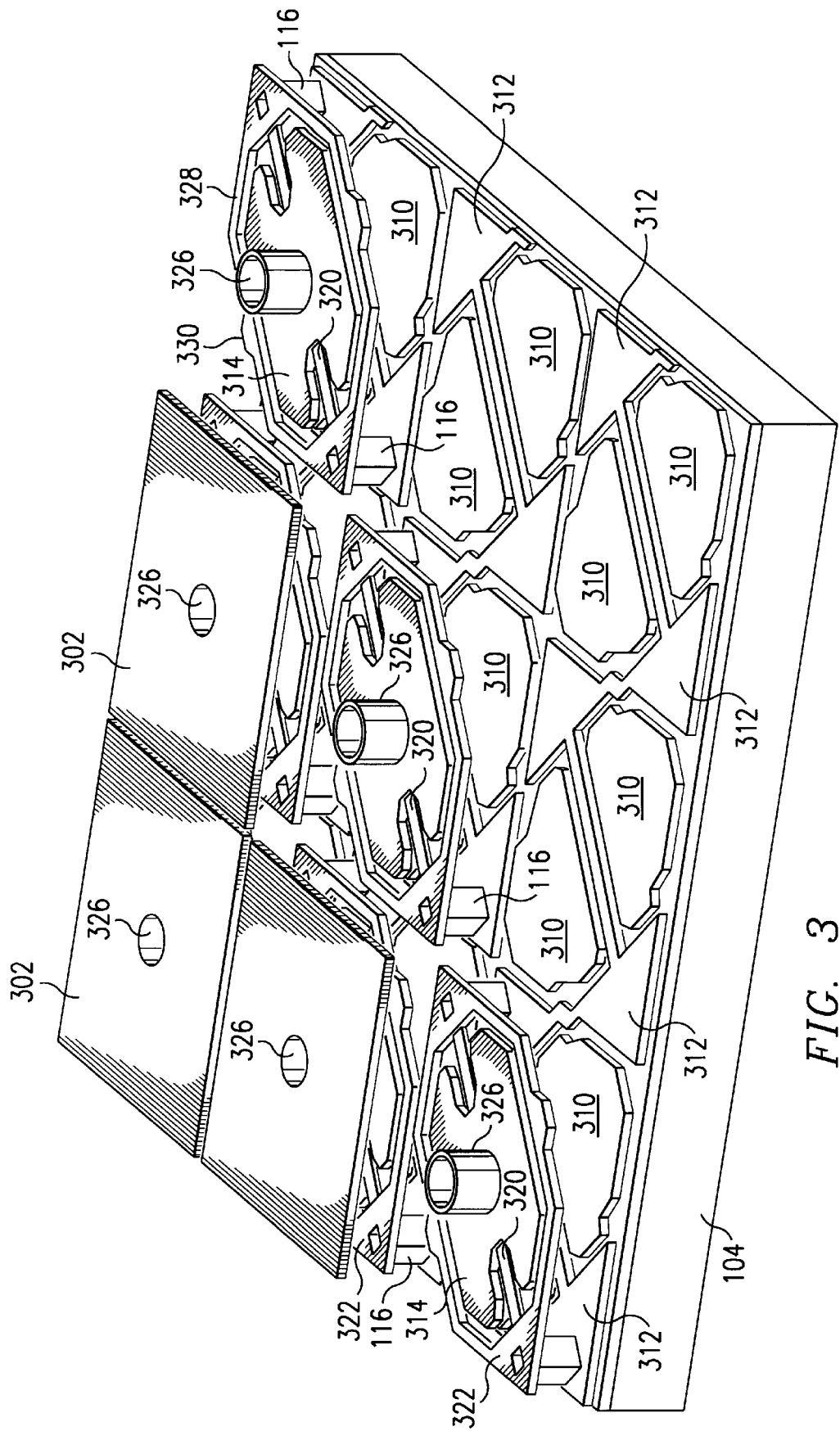
FIG. 3 is a perspective view of a small portion of a spring-ring micromirror array according to one embodiment of the present invention.
Figure 4:
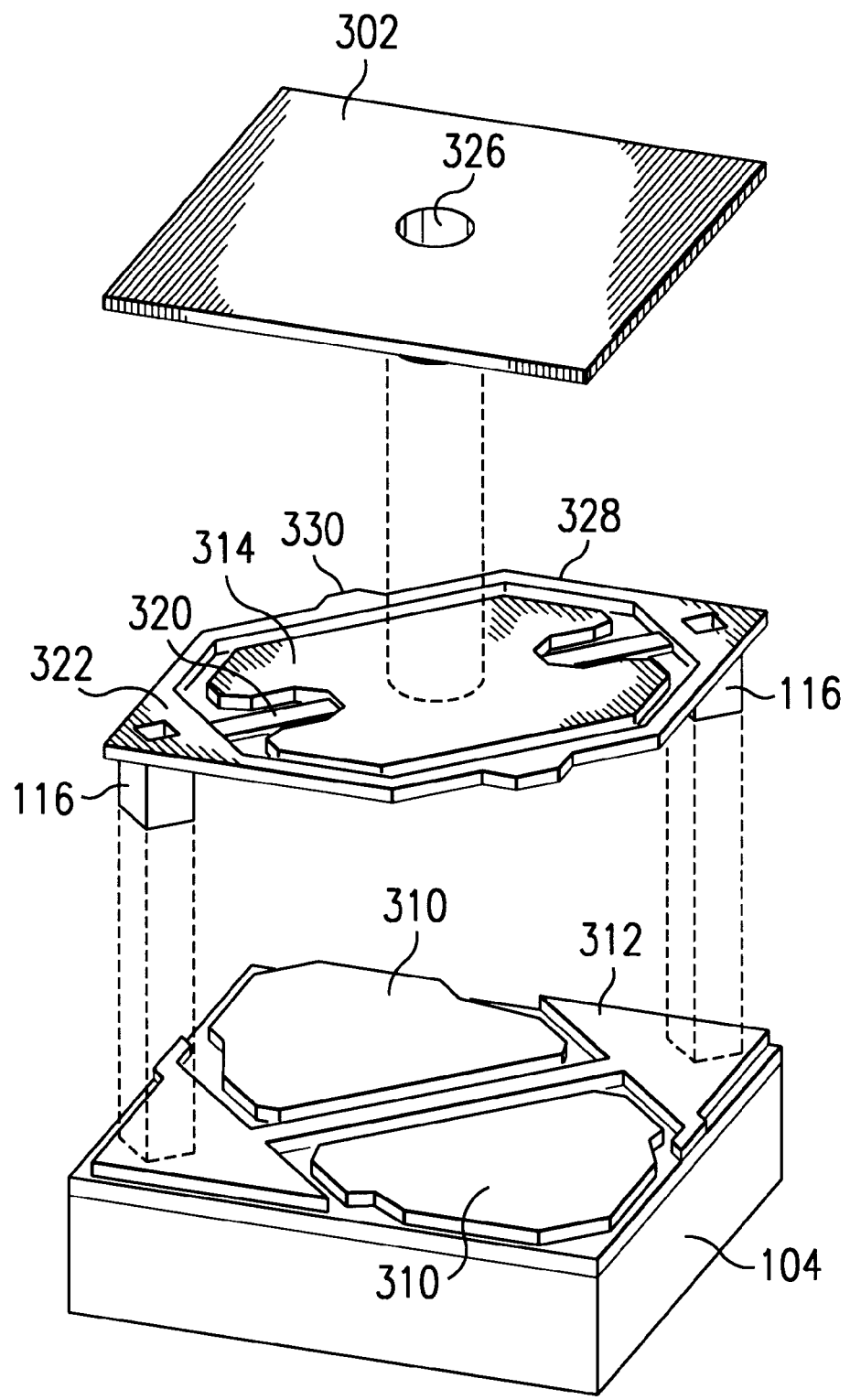
FIG. 4 is an exploded perspective view of a single micromirror element from the micromirror array of FIG. 3.

FIGS. 3 and 4 depict a hidden-hinge micromirror according to the recently developed spring-ring architecture. Although the invention taught herein is discussed primarily in terms of micromirror devices, the inventive concepts are applicable to other types of micromechanical devices.

As shown in FIGS. 3 and 4, a ring-shaped spring 328 is fabricated at the torsion beam yoke level extending around the torsion beam yoke 314. The spring ring 328 includes a nub 330 on the outside perimeter of the spring ring 328. When deflected, the bottom of the mirror 302 contacts the nub 330 and presses the spring ring 328 downward. As the mirror 302 presses downward on the spring ring 328, the spring ring 328 creates a restoring force pressing upward on the mirror 302.

The spring ring 328 stores energy when it is deflected by the mirror 302 and releases the stored energy as the mirror 302 is returned toward the undeflected state. When the electrostatic force deflecting the mirror 302 is removed or sufficiently reduced, the stored potential energy snaps the spring ring 328 back to the undeflected state, forcing the mirror 302 back toward its neutral position. The force of the spring ring 328 overcomes, or at least helps to overcome, stiction between the mirror 302 or yoke 114, and the spring ring 328 or mirror bias/reset metalization 112—freeing the mirror 302 and allowing the torsion beam hinges 320 to return the mirror 302 to the neutral position. Coupled with dynamic reset, in which the mirrors change positions by being propelled through the neutral position toward the opposite address electrode-where they are captured by the re-application of the mirror bias voltage, spring rings 328 ensure a reliable reset of all mirrors 302 in an array, eliminating the visual artifacts caused by stuck or prematurely released pixels.

Figure 5:
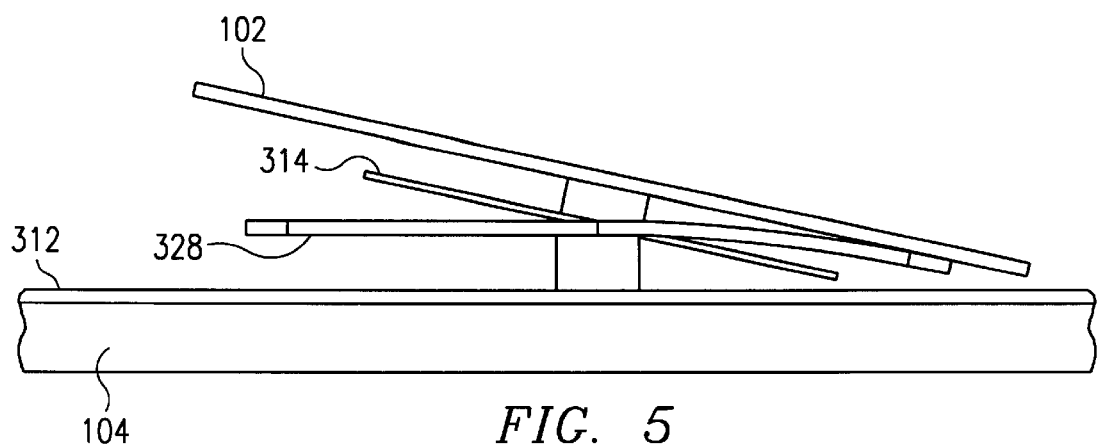
FIG. 5 is a side view of the single micromirror element of FIG. 4, showing the spring-ring stopping the rotation of the rigid deflectable member of the element prior to contact with the mirror bias/reset metalization layer.

According to a preferred embodiment of the disclosed invention, the restoring force created by the deflection of the spring ring 328 is sufficient to stop the rotation of the mirror 302 before the mirror 302 or yoke 314 contact either the address electrodes 310 or the mirror bias/reset metalization 312 on the surface of the substrate 104. FIG. 5 is a side view of a deflected hidden-hinge micromirror element according to the present invention showing the relationship between the deflected spring ring 328 and the mirror 302. In FIG. 5, the restoring force created by the deflection of the spring ring 328 is sufficient to stop the rotation of the mirror before the mirror 302 contacts either the mirror bias/reset metalization 312 or the address electrodes 310 on the surface of the device substrate 104.

Figure 6:
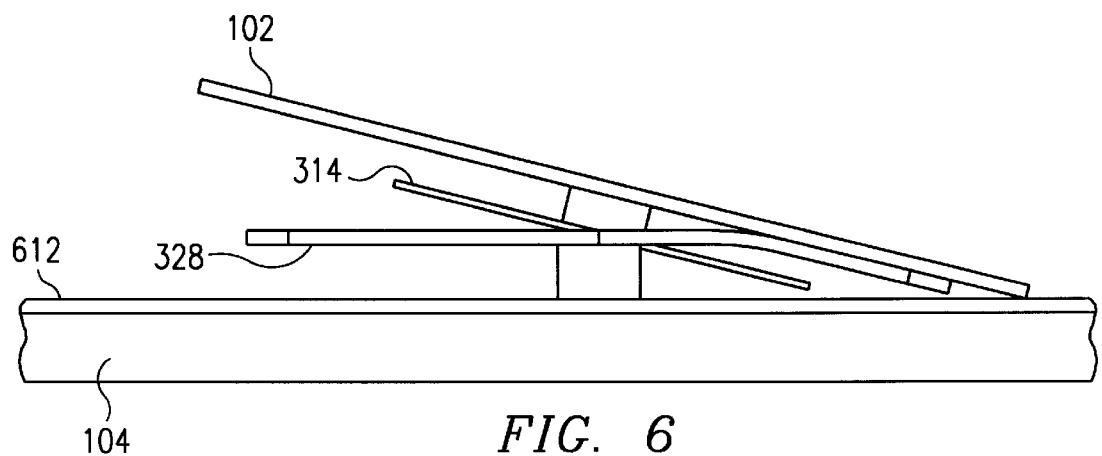
FIG. 6 is a side view of the single micromirror element of FIG. 4, showing the rotation of the rigid deflectable member deforming the spring-ring before the rotation is stopped by contact between the mirror and the mirror bias/reset metalization layer.
Figure 7:
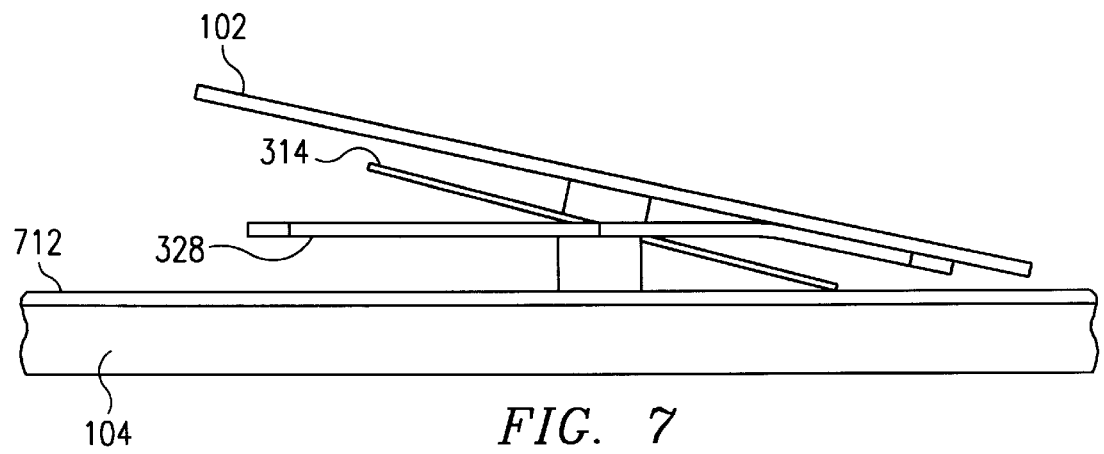
FIG. 7 is a side view of the single micromirror element of FIG. 4, showing the rotation of the rigid deflectable member deforming the spring-ring before the rotation is stopped by contact between the torsion beam yoke and the mirror bias/reset metalization layer.

According to an alternate embodiment of the disclosed invention, the restoring force created by the deflection of the spring ring 328 is insufficient to stop the deflection of the mirror 302 before the mirror 302 or yoke 314 contact either the address electrodes 310 or the mirror bias/reset metalization 312 on the surface of the substrate 104. FIGS. 6 and 7 are cross sections of a deflected hidden-hinge micromirror element according to the present invention showing the relationship between the deflected spring ring 328 and the mirror 302.

In FIG. 6, the restoring force created by the deflection of the spring ring 328 is insufficient to stop the rotation of the mirror before the mirror 302 contacts the mirror bias/reset metalization 612. Although contact with the mirror bias/reset metalization 612 stops the rotation of the mirror 302, the spring ring 328 still provides a restoring force which is sufficient to break the stiction between the mirror 302 and both the spring ring 328 and the mirror bias/reset metalization 612.

In FIG. 7, the restoring force created by the deflection of the spring ring 328 is insufficient to stop the rotation of the mirror before the torsion beam yoke 314 contacts the mirror bias/reset metalization 612. As in FIG. 6, although contact with the mirror bias/reset metalization 712 stops the rotation of the mirror 302, the spring ring 328 still provides a restoring force which is sufficient to break the stiction between the mirror 302 and both the spring ring 328 and the mirror bias/reset metalization 712.

The present invention, unlike prior devices which included a spring extension fabricated as part of the torsion beam yoke, teaches a spring that is not rigidly attached to the deflectable member. The structures taught herein preferably have a spring structure fabricated as part of an intermediate layer between a substrate and a portion of the rigid deflectable member, and positioned to limit the motion of the member.

The previous discussion has focused on a new architecture known as the spring-ring. The spring-ring architecture, however, is but one example of a micromechanical device having a spring member operable to inhibit the motion of a separate deflectable element. Many other architectures use a spring to stop the motion of a separate deflectable element.

Examples of alternate spring structures are shown in FIGS. 8, 9, 10, and 11. Like the spring-ring structure of FIGS. 3 and 4, these structures also provide an energy storing member capable of assisting the torsion beam hinges to resist mirror 302 deflection and returning the mirror 302 to an undeflected position. Two alternate spring structures, shown in FIGS. 8 and 9, employ leaf springs, or spring extensions, cantilevered away from the torsion beam support posts. A third alternate spring structure uses a ring-shaped structure having at least one thin torsion beam section operable to twist upon contact between the ring-shaped structure and the deflectable member.

Figure 8:
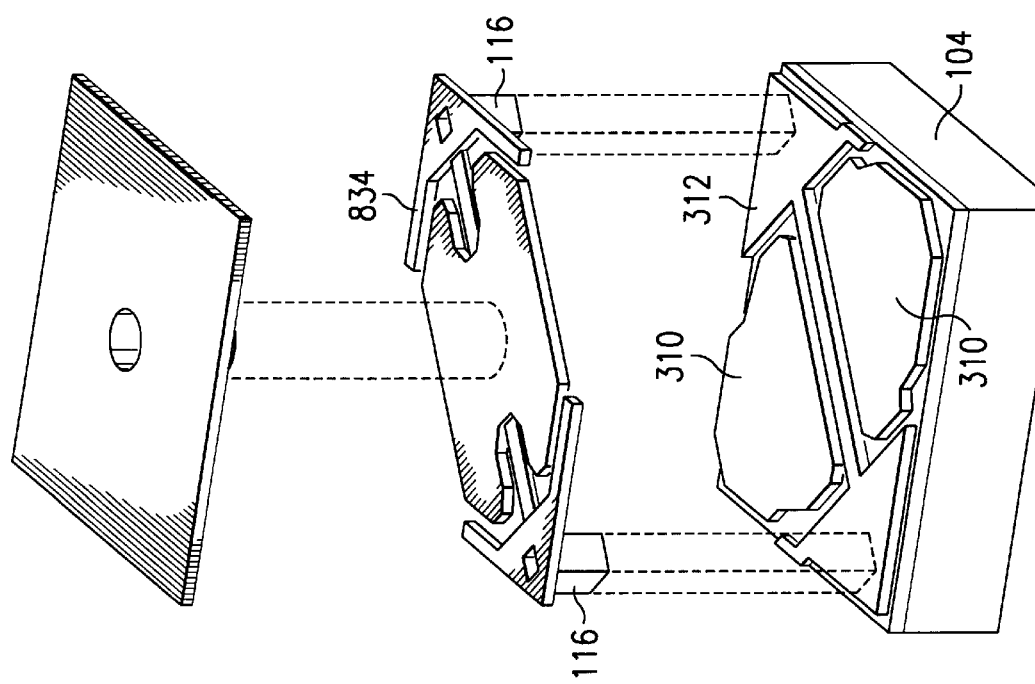
FIG. 8 is an exploded perspective view of a single micromirror element having thick spring extensions fabricated on the torsion beam caps.

FIG. 8 shows extensions 834 extending from the torsion beam caps 322. The thick extensions 834 are comprised of both the thin metal torsion beam layer and the thick metal layer used to form the torsion beam yoke 314 and torsion beam caps 322. The thick extensions 834 deform upon contact with the rotating mirror 302, and spring the mirror 302 toward the undeflected position when the electrostatic attraction between the deflectable rigid member and the address electrodes 110 is removed.

Figure 9:
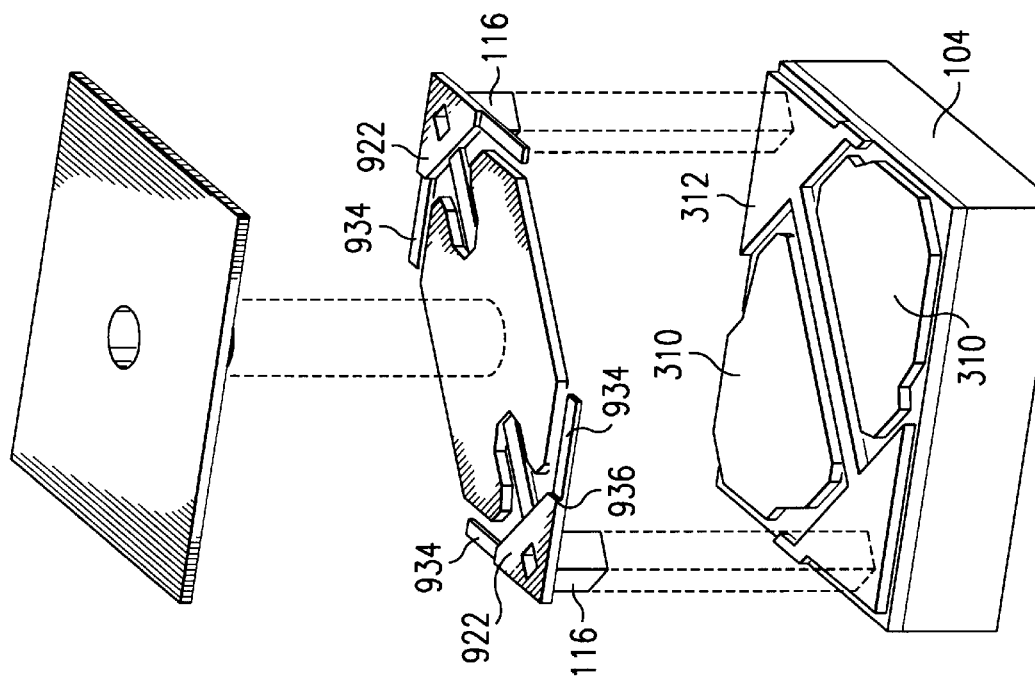
FIG. 9 is an exploded perspective view of a single micromirror element having thin spring extensions fabricated on the torsion beam caps.

FIG. 9 shows thin flexible extensions 934 extending from the torsion beam caps 922. The thin flexible extensions 934 are comprised of the thin torsion beam metal layer and deform when the rotating mirror contacts them. The deformation stores energy in the extensions 934 and is used to spring the mirror 302 toward the undeflected position when the electrostatic attraction between the deflectable rigid member and the address electrodes 110 is removed.

Figure 10:
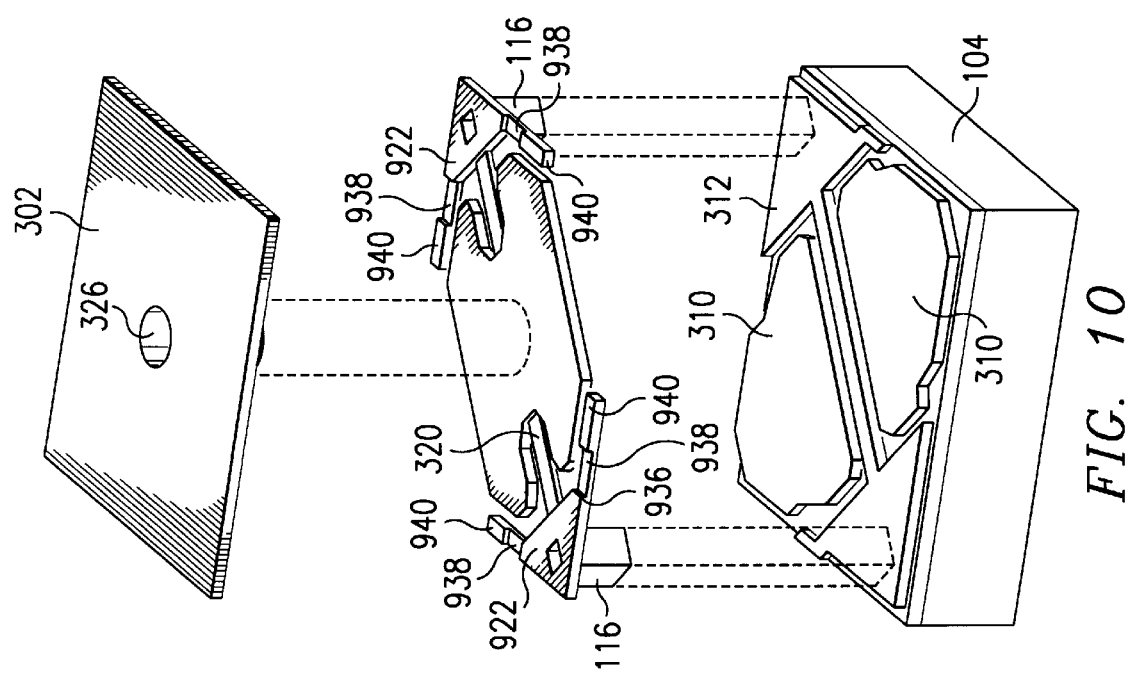
FIG. 10 is an exploded perspective view of a single micromirror element having thin spring extensions with a thin middle segment and a thick end segment.

One difficulty with the use of thin flexible extensions 934 from the torsion beam caps 922 is avoiding contact with the underside of the mirror 302. Because the extension 934 is so thin, it must be kept relatively short in order to maintain the stiffness required to return the mirror 302 to the undeflected position. Short flexible extensions, however, often deform enough to allow contact between the underside of the mirror 302 and the edge 936 of the thick torsion beam cap 922. To avoid contact between the edge 936 of the thick torsion beam cap 922 and the underside of the mirror 302, an embodiment shown in FIG. 10 provides a spring extension fabricated with both a thick end portion 940 and a thin middle segment 938. When deflected, the underside of the mirror 302 contacts the thick end segment—minimizing contact between the mirror 302 and the spring extension—while the thin middle segment 938 deforms.

It is difficult for thin flexible extensions to provide the consistent mirror rotation necessary to produce high quality images. As described above, the brightness of a pixel depends on the amount of light reflected by the mirror to the aperture of the display lens. Thus, if the mirror over-rotates, or under-rotates, to the point that some of the reflected light falls outside the aperture, not all pixels will have equal brightness, and the display quality is degraded. The same problem occurs if the mirror twists along the torsion beam axis instead of about the torsion beam axis. Furthermore, significant variation of the rotation from one array to the next complicates the optical alignment of each system. Therefore, each mirror in each array must rotate exactly the same amount, each time the mirror is rotated, for the life of the device.

Although thin torsion beam cap extensions 934 are easily fabricated, it is very difficult to fabricate thin torsion beam cap extensions 934 which provide consistent mirror deflections. The stiffness of the torsion beam cap extensions 934 is approximately related to the cube of the ratio of thickness to length. The metal layer forming the torsion beams is nominally 600 Å thick, whereas the thicker metal layer forming the torsion beam yoke and caps is nominally 4000 Å thick. Because the metal layer used to form the torsion beam hinges 320 and torsion beam cap extensions 934 is so thin in relation to the length of the thin cap extensions 934, a thickness variance of the magnitude typically incurred during production fabrication processes can make a large difference in the stiffness of the cap extensions 934. In embodiments in which the rigid deflectable structure is not stopped by the mirror bias/reset metalization layer, a large change in the stiffness of cap extensions 934 results in a material change in the extent to which the deflectable structure rotates. As discussed above, this variance in mirror rotation significantly degrades the image produced by the micromirror device.

The thicker the spring, the less effect a given thickness variation will have on spring stiffness. Therefore, thick torsion beam cap extensions 834, shown in FIG. 8, provide a more consistent stiffness than the thin torsion beam cap extensions 934 shown in FIG. 9 over a given range of metal thickness variance. While more consistent, the short length of the thick torsion beam cap extensions 834 of FIG. 8 sometimes are too stiff to provide the elastic spring necessary to help return the mirror 302 to the undeflected position.

The spring ring DMD 300 design provides a stable mirror deflection while providing the elastic force necessary to return the mirror 302 to the undeflected position. Because the spring ring is formed from both the thin torsion beam metal layer and the thicker torsion beam cap metal layer, manufacturing thickness variances are not a large in comparison to its nominal thickness and have little effect on the spring stiffness. Furthermore, the length of the spring ring reduces its stiffness—allowing it to flex to store enough energy to catapult the mirror toward the undeflected position.

The increased compliance of the spring ring 328—compared to thick torsion beam cap extensions 834—is due to the increased length of the spring ring 328. The shape of the spring ring 328 also provides additional features which make it preferable to elongated thick torsion beam cap extensions. First, because the spring ring 328 connects the extensions from each of the torsion beam caps 322, minor differences in the compliance of each separate extension will not tilt the mirror 302 about an axis perpendicular to the torsion beam axis. Second, by placing a nub 330 on the far side of the spring ring 328, the contact point between the spring ring 328 and the mirror 302 is minimized and controlled.

Although one nub 330 is shown, imperfections in the current mirror undercut process, the process by which the sacrificial spacer layers are removed, make it advantageous to use two closely spaced nubs, or a single notched nub. The undercut process tends to leave a very small irregular ridge of spacer material along the diagonal centerlines of the micromirror element. The ridge remains on the top and bottom surfaces of the torsion hinges, hinge caps, hinge yoke, and on the bottom surface of the mirror.

The ridge is only about 0.12 $\mu$m thick, but even this small thickness is sufficient to reduce the rotation of a deflected mirror by as much as 1.0°. Since the ridge reduces the rotation of some mirrors, the cone of light reflected by the under-rotated mirrors does not fall completely within the aperture of the projection optics—reducing the brightness of the pixels corresponding to the under-rotated mirrors. As little as 0.5° of under-rotation is perceptible, and 1.0° is clearly visible as a mottling of the projected image. To avoid image degradation caused by the ridge of remaining spacer material, the nub 330 is notched to avoid contact with the ridge, or two nubs are used—one on either side of the ridge.

Figure 11:
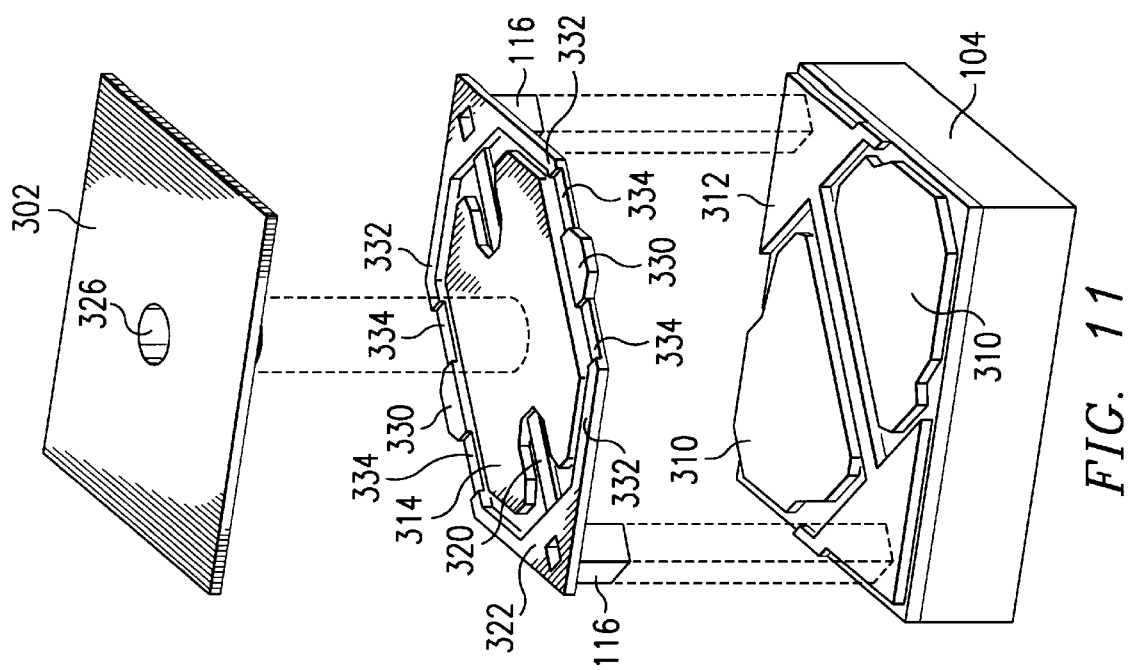
FIG. 11 is an exploded perspective view of a single micromirror element having a twist ring spring structure.

FIG. 11 details yet another embodiment of a micromechanical device having a spring-based return structure. In FIG. 11, each side of the ring structure 332 includes two thin segments 334, one on either side of the thick nub 330. While the entire ring structure 328 of FIGS. 3 and 4 is designed to deform upon contact with the underside of the mirror 302, only the thin segments 334 of the ring structure 332 of FIG. 11 deform—by twisting to allow the nub 330 to deflect.

All of the devices discussed thus far have included springs attached to the torsion beam support spacervias 116 and extending underneath the mirror 302. Although these embodiments keep the spring and support structures under the mirror 302 where they will not cause reflections which degrade the image quality—and are therefore preferred for applications in which the micromechanical device is used to form images—other applications do not require the spring and support structures to remain hidden from incident light. For these other applications, the spring may be fabricated above the deflectable element so that the deflectable element contacts the underneath side of the spring. The spring support structures may also be fabricated outside the perimeter of the micromirror 302 with the spring extending inward toward the deflectable element. Furthermore, some micromechanical elements may include deflectable elements that move side-to-side relative to the substrate rather than the up-and-down motion created by the twist of the torsion hinges. The spring is typically fabricated to the side of a deflectable element that has a side-to-side motion in order to position the spring where it can arrest the motion of the deflectable element.

One problem affecting current DMD designs is torsion beam hinge memory, or hinge creep. Torsion beam hinge memory occurs when the metal forming the torsion beams develops a permanent twist after the mirror is repeatedly rotated in a given direction. The twist, often caused by movement along intercrystalline slip planes, biases the mirror toward one direction of rotation. For a given deflection, hinge memory is less of a problem for highly-compliant spring structures.

If the electrostatic attraction between the address electrodes and the deflectable member is insufficient to overcome the bias created by torsion beam hinge memory, the mirror will always rotate in the direction of the torsion beam hinge memory when the mirror bias voltage is applied—regardless of the data applied to the address electrodes. Although torsion beam hinge memory rarely rises to the level at which the address electrodes cannot overcome the torsion beam hinge memory, torsion beam hinge memory reduces the address margin and causes intermittent errors. Intermittent mirror rotation errors are most often observed as a twinkling effect in darker regions of an image.

Spring-based designs enable the use of highly compliant hinges, which are less likely to develop hinge creep. The spring ring 328 not only functions to force the mirror 302 toward the undeflected neutral region, or across the neutral region in the case of dynamic reset, it also assists the torsion beams 320 in resisting, and finally stopping, the electrostatic rotation of the rigid deflectable member. Since the torsion beams 320 no longer provide all of the resistive and restorative torque, the compliance of the torsion beams 320 can be increased while retaining sufficient resistive and restorative torque by the inclusion of the spring ring 328.

Torsion beam compliance is determined by the length, width, and thickness of the torsion beam hinges, and by the material forming the torsion beams. All of these parameters are limited by capabilities of the manufacturing process, or physical restraints on the size of the micromirror elements. Perhaps the best way to increase torsion beam compliance is to reduce the thickness of the torsion beams. Reducing the thickness of the torsion beams, from 635 Å to 600 Å, increases the compliance of the hinges. While further reductions in torsion beam thickness would further increase the compliance, the thickness of the torsion beams is difficult to control at thicknesses less than 600 Å.

The spring ring design 300 also improves the mechanical reliability of the micromirror array. One potentially highly loaded point of the micromirror superstructure is the connection between the mirror support spacervia 326 and the torsion beam yoke 314. The connection between the mirror support spacervia 326 and the torsion beam yoke 314 is weakened by regions of poor metal distribution in the mirror support spacervia 326 where the vertical spacervia walls intersect the horizontal base of the spacervia. The metal distribution across this interface is called step coverage. Step coverage problems are due to the inherent difficulties in depositing metal into a hole in the spacer layer and are further discussed in U.S. Pat. No. 5,703,728, entitled "Support Post Architecture for Micromechanical Devices" issued Dec. 30, 1997.

Even without strengthening the connection between the mirror support spacervia 326 and the torsion beam yoke 314, the "soft landing" provided by the spring ring 328 improves device reliability by reducing the stress on the connection between the mirror 302 and the mirror support spacervia 326. Several factors contribute to this stress reduction. First, the spring ring brings the mirror 302 to a more gradual stop as opposed to the abrupt stop which previously occurred when either the torsion beam yoke 114 or mirror 102 struck the mirror bias/reset metalization.

Secondly, the spring ring 328, by contacting and stopping the mirror 302 eliminates the destructive effect of the mirror inertia on the mirror support 326 to torsion beam yoke 314 connection. The mirror 302, due to its relatively large mass, is responsible for about 60% of the inertia of the rigid deflectable member. In prior art devices which landed the torsion beam yoke 114 on the mirror bias/reset metalization layer 112, this large inertial force—using the length of the mirror support spacervia 126 as a lever arm—created a large torsional force on the junction between the mirror support spacervia 126 and the torsion beam yoke 114. By landing the mirror 302 directly on the spring ring, this inertial force is eliminated and replaced by the much smaller torque generated by the electrostatic attraction between the address electrodes 310 and the torsion beam yoke 314.

Both the soft landing characteristics and the elimination of the stresses caused by the mirror inertia reduce the stress on the mirror support spacervia 326. As a result, much smaller diameter spacervias, such as the spacervia 326 shown in FIGS. 3 and 4, are feasible. Spacervias take up space which would otherwise be used as active mirror area. Since the top of the spacervia is open, light striking the spacervia region cannot be selectively reflected to the image plane. Therefore, smaller spacervias increase the active mirror area and the optical efficiency of the micromirror device.

In addition to improving image brightness, small spacervias also increase the contrast ratio of the projected image. Light striking the spacervia region is scattered regardless of which direction the mirror is tilted. Some of the scattered light reaches the projected image. Since the scattered light reaching the image is randomly spread across the image, the light tends to brighten the dark regions of the image, washing out the image and lowering the contrast ratio.

Light scattered by the interface between the mirror 302 and the mirror support spacervia 326 is more likely to reach the aperture of the projection lens, and therefore the projected image, if it is scattered by a straight edge, especially if the straight edge is parallel to the axis of the torsion beam hinges 320. To reduce the effect of scattered light, and to strengthen the mirror support, prior art micromirrors used mirror supports having a rectangular cross section with the sides parallel to the torsion beam are shorter than the sides perpendicular to the hinge. As shown in FIGS. 1 and 2, the mirror support spacervia width is approximately 4 $\mu$m in the direction perpendicular to the torsion beams 120 and 3 $\mu$m in the direction parallel to the torsion beams 120.

By reducing the circumference of the mirror support spacervia 326, the length of the interface between the mirror 302 and the mirror support spacervia 326 is reduced—reducing the amount of light scattered by interface. If the spacervia 326 is made sufficiently small, the response of the photosensitive spacer material in which the mirror support spacervia 326 is formed and the diffraction caused by the photolithography process round the square corners of the mirror support spacervia 326—eliminating or greatly reducing the straight edges which are more likely to reflect light into the projection system aperture. A spacervia 2.6 $\mu$m across is large enough to prove the necessary strength, yet small enough for the photolithography process to result in rounded corners.

Figure 12:
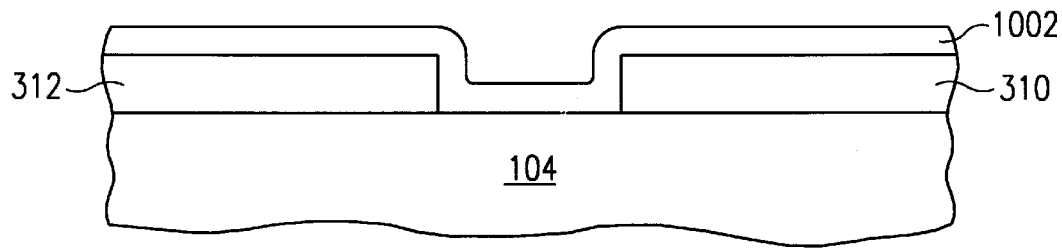
FIG. 12 is a cross-section view showing an antireflective coating on an address electrode and the mirror bias/reset metalization.

Several other advantages are a side effect of the mirror 302 not landing on the M3 metalization layer. One such advantage is the ability to use antireflective coatings on the structures underneath the mirrors 302. Light passing through gaps between the mirrors is scattered by the mirror support structures and the M3 metalization layer on the surface of the substrate 104. Some of this light eventually passes back through a gap between the mirror and enters the aperture of the projection lens system—reducing the contrast ratio of an image created by the micromirror array. One method of improving the contrast ratio is to apply an antireflective coating to the surfaces under the mirror. The antireflective coating 1002, shown in FIG. 12, reduces the reflections from the coated surfaces resulting in less stray light to degrade the projected image.

Unfortunately, no known antireflective coating 1002 is both easy to apply to the address electrodes 310 and mirror bias/reset metalization 312 and sufficiently resistant to the abrasion dynamic reset generates between the mirror bias/reset metalization 312 and the mirror 302 or yoke 314. Spring-based micromirror designs, however, by eliminating contact between the mirror 302 and the M3 layer enable the use of antireflective coatings 1002.

Eliminating contact between the mirror 302 and the mirror bias/reset metalization layer 312 also enables improvements in both the device's electrical reliability and resistance to mechanical debris. When the spring ring 328 stops the rotation of the mirror 302, a separate landing site on the mirror bias/reset metalization 112 is not required. Eliminating this landing site, which formerly stopped the rotation of the mirror by contacting the torsion beam yoke 114 or mirror 102, makes additional space available on the M3 metalization layer.

The additional space, especially at the portions of the layer farthest away from the hinge axis, is used for larger address electrodes. The additional space is also used to provide larger gaps between the address electrodes and the mirror bias/reset metalization. The larger gaps increase the device's immunity to short circuits caused by particles and provide increased tolerance against manufacturing defects—thus increasing the manufacturing yield of the device. Additionally, some of the additional space may be used to simplify the routing of the mirror bias/reset signal, especially when using split reset addressing methods.

The larger address electrodes 310 increase the capacitance of the air capacitor formed by the rigid deflectable member and the address electrodes. Extending the address electrodes 310 away from the axis of the torsion beam 320 increases the torque generated by the electrostatic attraction between the address electrodes 310 and the rigid deflectable member. The increased capacitance and increased torque cooperate to increase the reliability of the operation of the device, and to lower the voltage differential required to operate the device.

In addition to providing more consistent device operation, the improved electrostatic margins provided by a larger address electrode 310 eliminate the need for the upper address electrodes 124, shown in FIGS. 1 and 2, which previously were required to generate an electrostatic attraction between the upper address electrodes 124 and the mirror 102. Without the upper address electrodes 124, the mirror support spacervia 326 need not be as tall as in prior designs in which a tall mirror support spacervia 126 was required in order to prevent contact between the mirror 102 and the upper address electrode 124. The elimination of the upper address electrodes 124 also enables a larger torsion beam yoke 314, which increases the electrostatic torque generated by the device.

The shorter mirror support spacervia 326 provides several benefits. First, the reduced gap between the mirror 302 and the address electrodes 310 increases the electrostatic force generated by a given voltage differential between the mirror 302 and the address electrodes 310—further improving the electrostatic performance of the device. Second, since the mirror support spacervia 326 is an additional moment arm through which the inertia of the mirror operates, reducing the height of the mirror support spacervia 326 reduces the stress on the junction between the mirror support spacervia 326 and the torsion beam yoke.

Furthermore, the shorter mirror support spacervia 326 further improves the contrast ratio of the generated image by reducing the amount of light able to pass between the mirrors 302. A shorter mirror support spacervia 326 reduces the gaps between the mirrors 302 when the mirrors are rotated—reducing the amount of light passing through the gaps. Light passing through the gaps between the mirrors 302 is reflected by the underlying structures and the mirror bias/reset metalization layer. Some of the light reflected by the underlying structures passes back through a mirror gap and reaches the image plane where it washes out the projected image and reduces the contrast ratio of the display.

Because the torsion beam yoke 314 no longer contacts the mirror bias/reset metalization layer 312, the height of the torsion beam support spacervias 116 no longer controls the final tilt angle of the mirror 302. Since the height of the torsion beam support spacervias 116 does not affect the tilt angle, and because the elimination of the landing sites and upper address electrodes greatly improves the electrostatic performance of the device, the height of the torsion beam support spacervia 116 can vary over a relatively large range.

The torsion beam support spacervia 116 height is a tradeoff between electrostatic performance and immunity from debris. Shorter torsion beam support spacervias 116 reduce the gap between the torsion beam yoke 314 and the address electrodes 310 thereby increasing the electrostatic attraction between them. But the smaller the gap between the torsion beam yoke 314 and the address electrodes 310, the more susceptible the device is to failures caused by debris inside the device package. Debris between the torsion beam yoke 314 and the address electrodes 310 not only mechanically limits the rotation of the mirror 302, it can also short circuit the torsion beam yoke 314 to the address electrodes 310.

The height of the torsion beam support spacervias 116 and the mirror support spacervias 326 is determined by the thickness of the spacer layer used to form the support spacervias. Prior art devices utilized a 1.18 μm spacer to form the torsion beam support spacervia 116, and a 2.15 μm spacer layer to form the mirror support spacervia 126. These spacer layers, coupled with a 0.32 μm thick torsion beam yoke 114, result in a 3.65 μm mirror height. One embodiment using the spring return structures taught herein utilizes 1.46 μm spacer layers to form both the torsion beam support spacervias 116 and the mirror support spacervias 326. Coupled with a 0.36 μm thick torsion beam yoke 314, this embodiment results in a 3.28 μm mirror height. In spite of the larger gap between the torsion beam yoke 314 and the address electrodes 310, the device taught herein has improved electrostatic performance, increased immunity to debris, and is capable of producing images with increased contrast ratios due to the lower mirror height and the addition of the antireflective coating applied to the mirror bias/reset metalization layer 312.

Fabrication of the improved device does not require additional processing steps. According to one fabrication method, the landing springs, whether yoke extensions 832, torsion beam cap extensions 834 and 934, spring rings 328, or twist ring 332 are fabricated simultaneously with the torsion beam yolk 314 and torsion beam caps 322. All that is required to form the landing springs is a change in either the torsion beam etch stop photolithography mask, or the torsion beam cap and yoke photolithography mask, or both.

Figure 13:
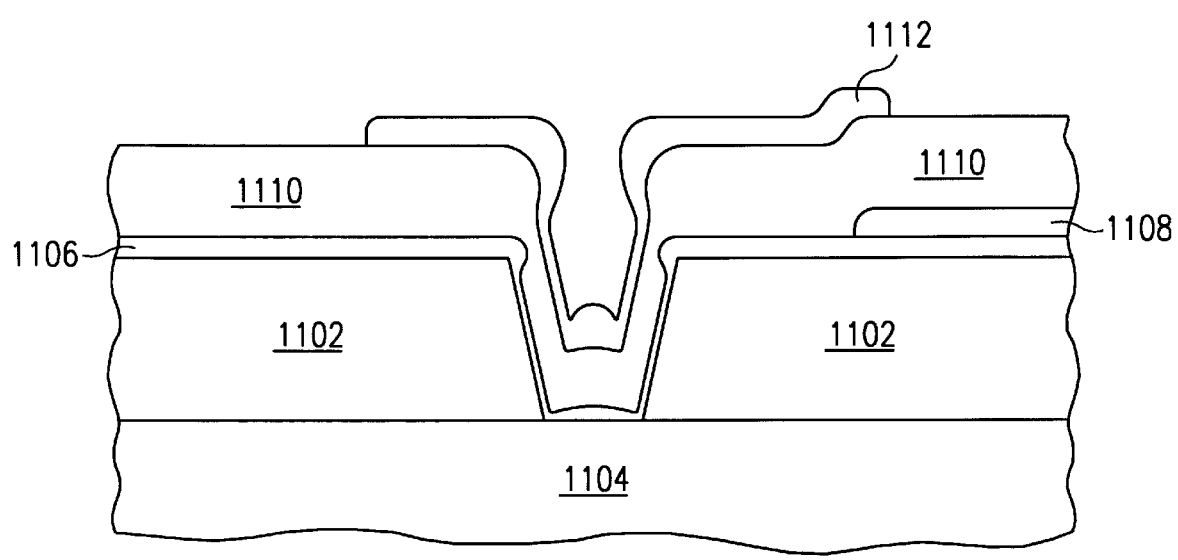
FIG. 13 is a cross section view of the spacer, metal, and oxide layers used to fabricate the torsion beam support spacervias, torsion beams, torsion beam yoke, and spring ring of the spring-ring micromirror array of FIG. 3.

FIG. 13 is a cross section view of the spacer, metal, and oxide layers used to fabricate the torsion beam support spacervias 116, torsion beams 320, torsion beam yoke 314, and spring ring 328 of the spring-ring micromirror array of FIG. 3. As shown in FIG. 13, a spacer layer 1102, typically a 0.8 μm thick layer of positive photoresist, is deposited on an integrated circuit substrate 1104 and patterned to form a hole, or via, in which the torsion beam support spacervia 116 is formed. Any required electronic circuitry, metal circuit interconnections, address electrodes, and mirror bias/reset metalization layers are formed on the substrate prior to depositing the spacer layer 1102.

A thin metal layer 1106, which forms the torsion beams 320, is sputtered over the spacer layer 1102 and into the via. An oxide layer 1108 is deposited over the thin metal layer 1106 and patterned to form etch stops over regions of the thin metal layer 1106 which will form the torsion beams. Additional etch stops are formed over regions forming thin spring structures such as the thin torsion beam cap extensions 934 shown in FIG. 9 and the thin portions 334 of the twist rings 332 shown in FIG. 11.

Next, a thick metal layer 1110 is sputtered over the thin metal layer 1106 and etch stops. A second oxide layer 1112 is deposited over the thick metal layer 1110 and patterned to form etch stops over the regions of the thick metal layer 1110 forming torsion beam support spacervias 116, torsion beam support caps 322, and the torsion beam yoke 314. Additional etch stops are formed over regions forming thick spring structures such as the spring ring 328 and nub 330 shown in FIG. 3, thick torsion beam cap extensions 834 shown in FIG. 8, and the thick portions and nub 330 of the twist ring shown in FIG. 11.

Figure 14:
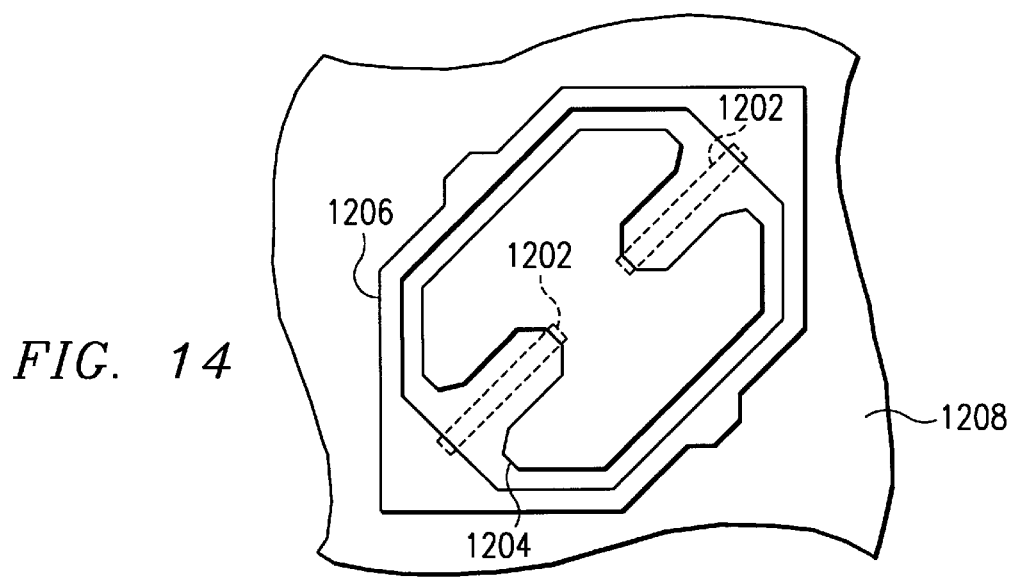
FIG. 14 is a plan view of a partially completed spring-ring micromirror device of FIG. 4 showing the location of torsion beam etch stops, torsion beam yoke etch stops, and etch stops used to form both the torsion beam spacervia caps and spring-ring.

FIG. 14 is a plan view of a partially completed spring-ring micromirror device of FIG. 4 showing the location of torsion beam etch stops 1202, a torsion beam yoke etch stop 1204, and an etch stop 1206 used to form both the torsion beam spacervia caps and spring-ring. As shown in FIG. 14, the etch stops used to form the torsion beam yoke, spacervia caps, and spring ring cover both the thick metal layer 1208 and the thin metal layer, while the etch stops 1202 forming the torsion beams are between the two metal layers and are shown by hidden lines.

Figure 15:
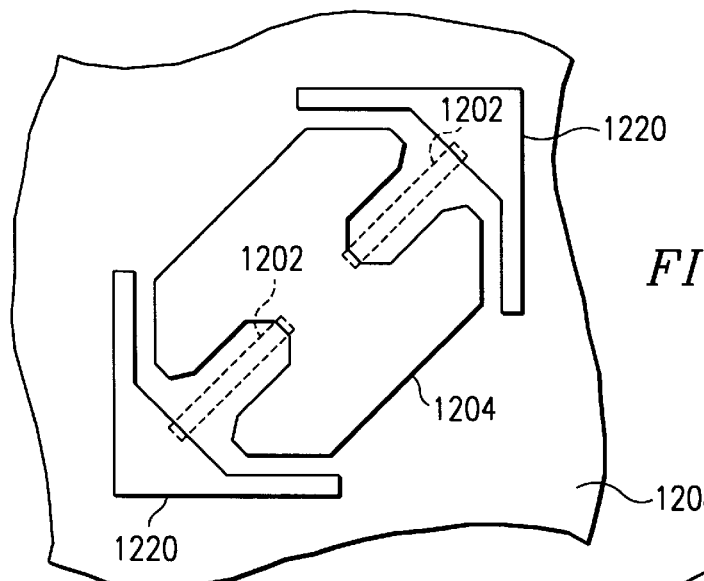
FIG. 15 is a plan view of a partially completed thick torsion cap extension spring micromirror device of FIG. 8 showing the location of torsion beam etch stops, torsion beam yoke etch stops, and etch stops used to form both the torsion beam spacervia caps and the thick spring cap extension.

FIG. 15 is a plan view of a partially completed micromirror device of FIG. 8 showing the location of torsion beam etch stops 1202, a torsion beam yoke etch stop 1204, and etch stops 1306 used to form both the torsion beam spacervia caps and the thick spring cap extension. As shown in FIG. 15, the etch stops used to form the torsion beam yoke, spacervia caps, and spring cap extensions cover both the thick metal layer 1208 and the thin metal layer, while the etch stops 1202 forming the torsion beams are between the two metal layers and are shown by hidden lines.

Figure 16:
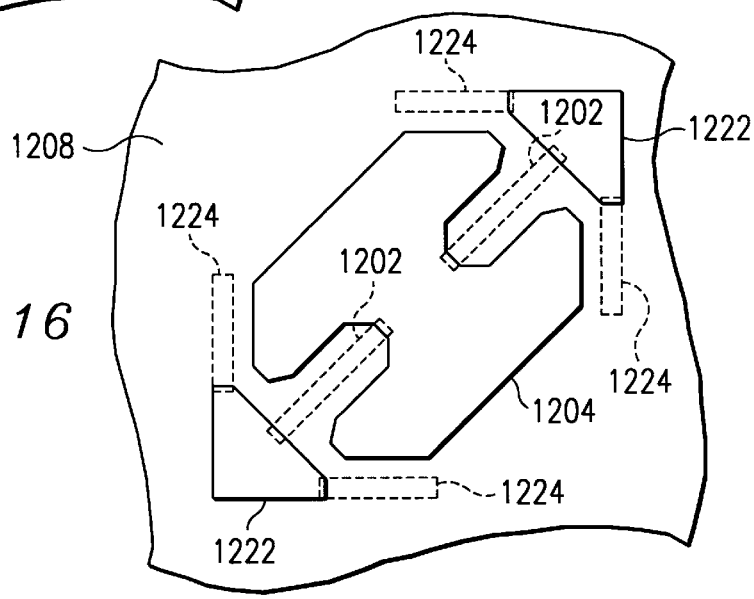
FIG. 16 is a plan view of a partially completed thin torsion beam cap extension spring micromirror device of FIG. 9 showing the location of torsion beam etch stops, torsion beam yoke etch stops, torsion beam spacervia cap etch stops, and spring cap extension etch stops.

FIG. 16 is a plan view of a partially completed thin torsion beam cap extension spring micromirror device of FIG. 9 showing the location of torsion beam etch stops 1202, a torsion beam yoke etch stop 1204, torsion beam spacervia cap etch stops 1406, and spring cap extension etch stops 1412. As shown in FIG. 16, the etch stops used to form the torsion beam yoke and spacervia caps are on both the thick metal layer 1208 and the thin metal layer, while the etch stops forming the torsion beams 1202 and spring cap extensions 1412 are between the two metal layers and shown by hidden lines.

Figure 17:
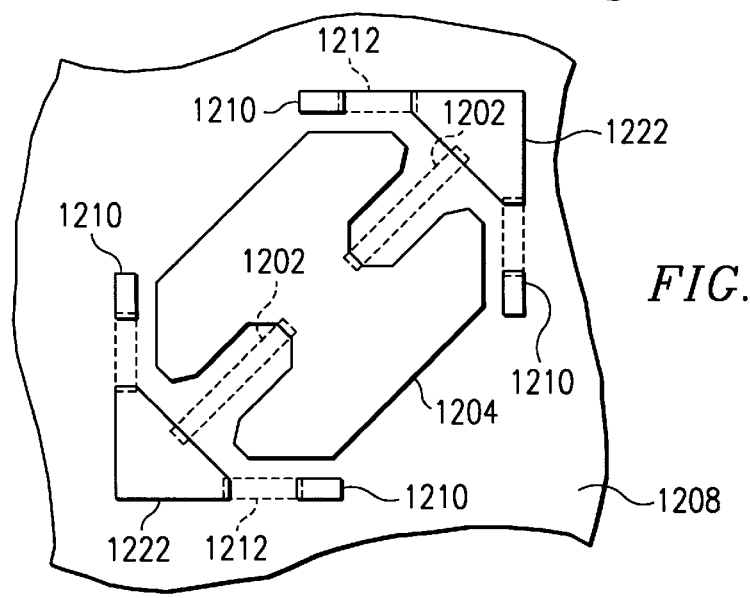
FIG. 17 is a plan view of a partially completed torsion beam cap extension spring micromirror device of FIG. 10 showing the location of torsion beam etch stops, torsion beam yoke etch stops, torsion beam spacervia cap etch stops, and spring cap extension etch stops.

FIG. 17 is a plan view of a partially completed micromirror device of FIG. 10 showing the location of torsion beam etch stops 1202, a torsion beam yoke etch stop 1204, etch stops 1222 used to form both the torsion beam spacervia caps and spring cap extension, and the etch stops 1210 used to form the thick end of the spring cap extensions. Etch stop 1212 determines the shape of the thin portion of the spring extension. As shown in FIG. 15, the etch stops used to form the torsion beam yoke, spacervia caps, and spring cap extensions cover both the thick metal layer 1208 and the thin metal layer, while the etch stops 1202 forming the torsion beams and the thin portions of the spring extensions are between the two metal layers and are shown by hidden lines.

Figure 18:
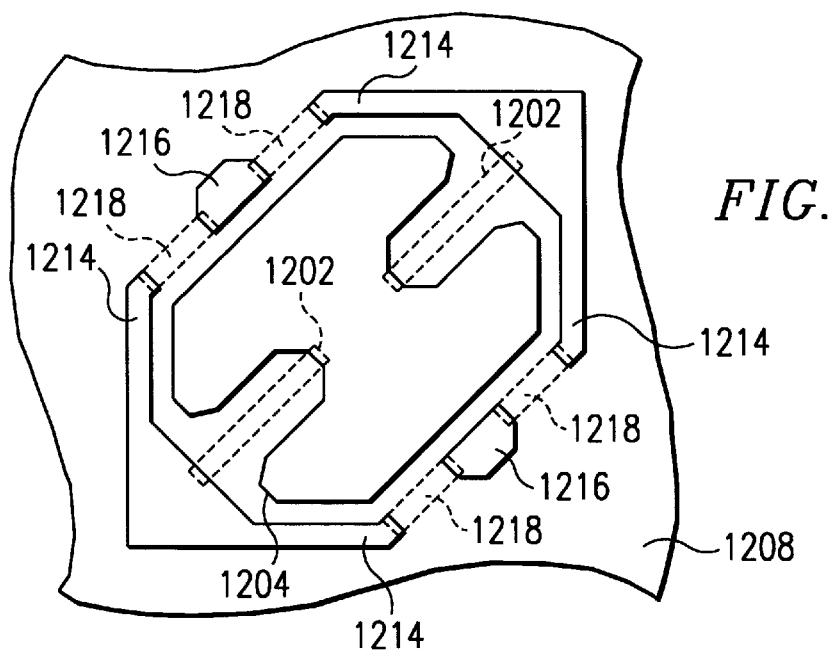
FIG. 18 is a plan view of a partially completed twist ring micromirror device of FIG. 11 showing the location of torsion beam etch stops, torsion beam yoke etch stops, torsion beam spacervia cap etch stops, and twist ring etch stops.

FIG. 18 is a plan view of a partially completed spring-ring micromirror device of FIG. 11 showing the location of torsion beam etch stops 1202, a torsion beam yoke etch stop 1204, an etch stop 1214 used to form both the torsion beam spacervia caps and the thick portion of the twist ring, and an etch stop 1216 used to form the nub of the twist ring. As shown in FIG. 18, the etch stops used to form the torsion beam yoke, spacervia caps, thick portion of the twist ring, and twist ring nub cover both the thick metal layer 1208 and the thin metal layer, while the etch stops 1202, 1218 forming the torsion beams and the thin portion of the twist ring are between the two metal layers and are shown by hidden lines.

Figure 19:
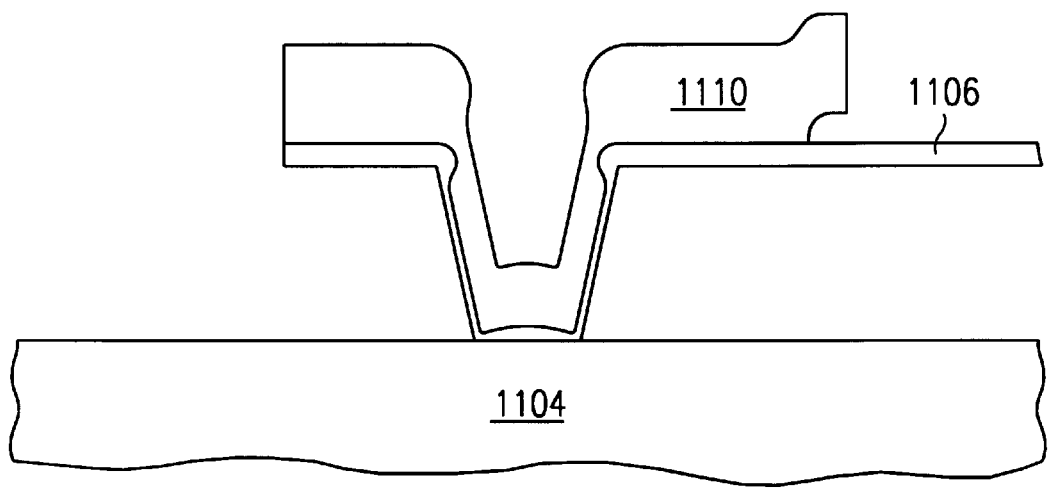
FIG. 19 is a cross section view of the metal layers shown in FIG. 13 after the metal layers have been patterned and the oxide and spacer layers have been removed.

FIG. 19 is a cross section view of the metal layers shown in FIG. 13 after the metal layers have been patterned and the oxide etch stops and spacer layers have been removed. After forming the metal layers and patterning the oxide etch stops, a single etch step is used to remove all regions of the thick and thin metal layers that are not covered by an etch stop. After the metal layers are etched, the oxide etch stops are removed. The spacer layer is not removed until after the mirror support spacervia and mirror have been formed above it. Once the spacer layers are removed, the rigid deflectable member is free to rotate about the axis formed by the torsion beams.

Figure 20:
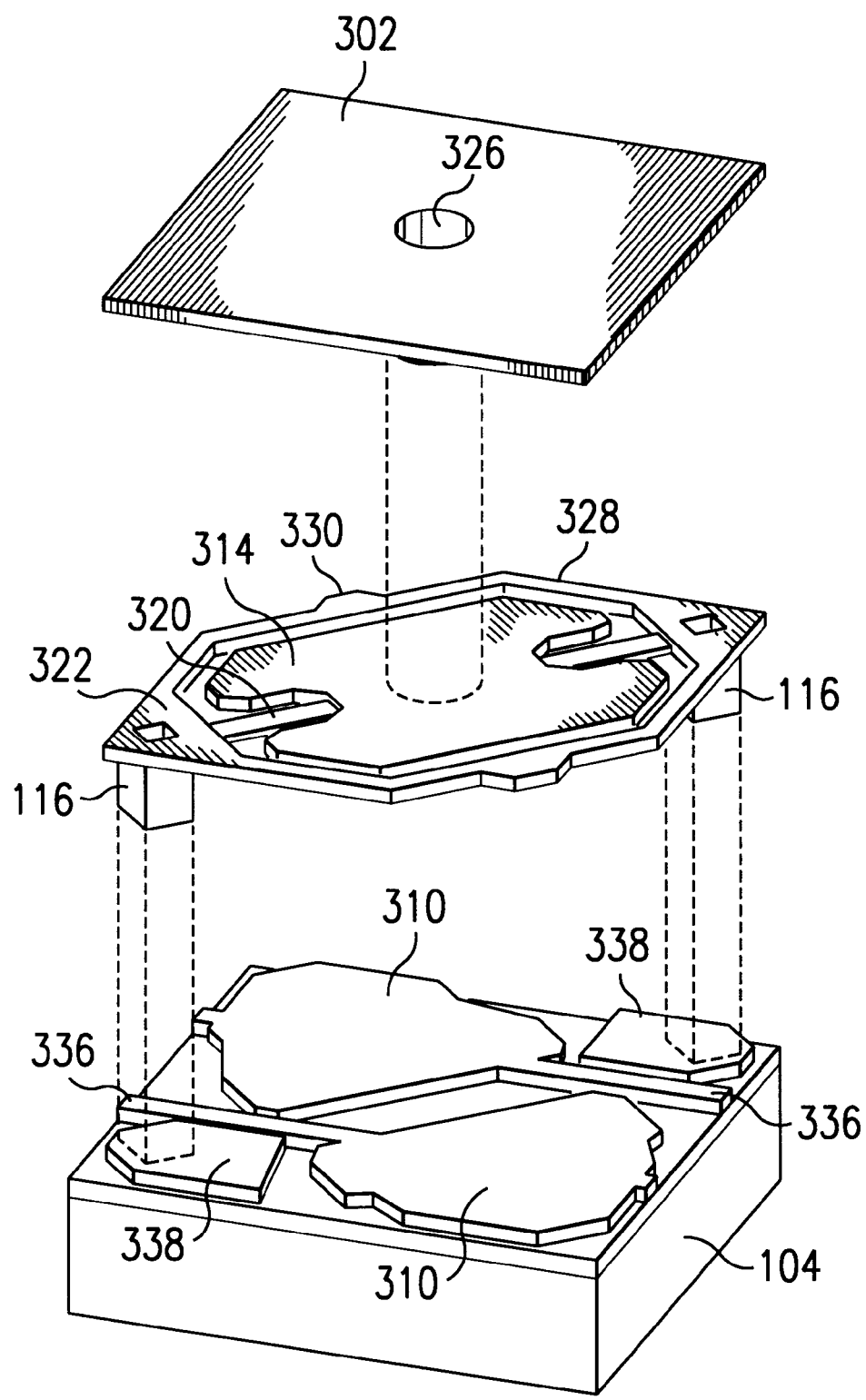
FIG. 20 is an exploded perspective view of a single micromirror element similar to the micromirror array of FIG. 3, but having a mirror bias/reset metalization layer which enables mirror addressing.

FIG. 20 is an exploded perspective view of a single DMD element having the spring ring structure of FIG. 4. The device of FIG. 20 replaces the mirror bias/reset metalization layer 312 with torsion beam support pads 338, and adds interconnections 336 between the address electrodes 310 to enable an alternate mirror address scheme. The typical DMD addressing scheme applies a unique address voltage—and its complement—to each pair of address electrodes 310 depending on the desired direction of rotation, and a common bias voltage to all of the mirrors. The mirror addressing scheme enabled by the mirror bias/reset metalization of FIG. 20 allows each mirror to receive a unique address voltage while two device-wide bias signals are applied to the address electrodes 310 on each side of the torsion beam axis.

The shape and location of the address electrodes 310 of FIG. 20 is the same as the shape and location of the address electrodes 310 of FIG. 4. Maintaining the same address electrodes 310 ensures the operation of the micromirror devices will be the same regardless of which addressing scheme is employed. Interconnections 336 connect all of the address electrodes 310 on a given side of the torsion beam axis with each of the other similarly located address electrodes 310 in the row of elements. Connections between the rows of elements are made outside the active portion of the array.

Figure 21:
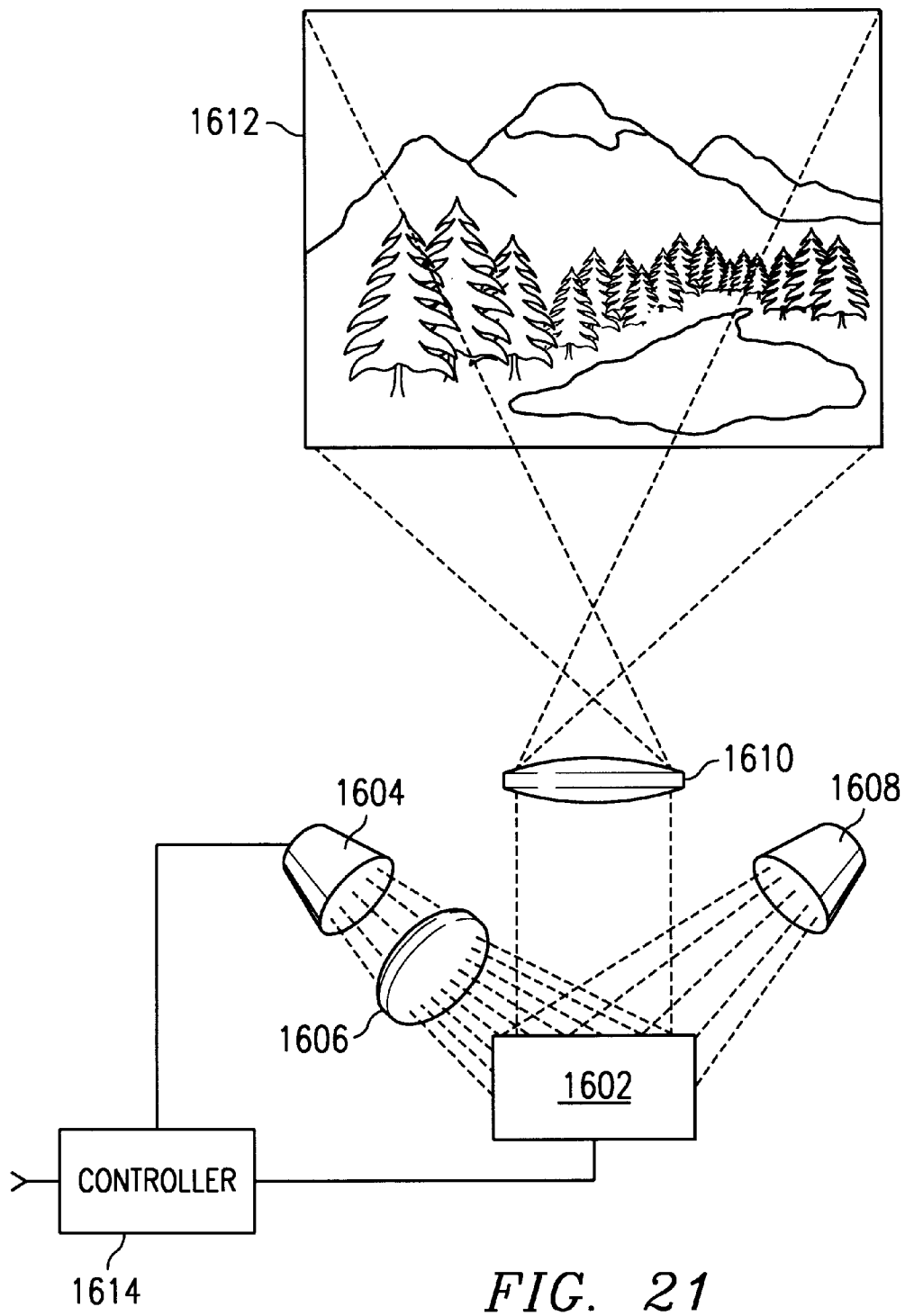
FIG. 21 is a schematic view of a micromirror-based projection system utilizing an improved micromirror device according to one embodiment of the present invention.

FIG. 21 is a schematic view of an image projection system 1600 using an improved micromirror 1602 according to the present invention. In FIG. 21, light from light source 1604 is focused on the improved micromirror 1602 by lens 1606. Although shown as a single lens, lens 1606 is typically a group of lenses and mirrors which together focus and direct light from the light source 1604 onto the surface of the micromirror device 1602. Image data and control signals from controller 1614 cause some mirrors to rotate to an on position and others to rotate to an off position. Mirrors on the micromirror device that are rotated to an off position reflect light to a light trap 1608 while mirrors rotated to an on position reflect light to projection lens 1610, which is shown as a single lens for simplicity. Projection lens 1610 focuses the light modulated by the micromirror device 1602 onto an image plane or screen 1612.

Thus, although there has been disclosed to this point a particular embodiment for micromechanical device having a spring return structure, and method of fabricating a micromechanical device having a spring return structure, and a display system using a micromirror device having a spring mirror return structure, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. An improved micromechanical device comprising:
   a substrate;
   a rigid deflectable member suspended over said substrate; and
   at least one spring supported above said substrate and spaced apart from said rigid deflectable member, said spring operable to resist deflection of said rigid deflectable member when deflection of said rigid deflectable member creates contact between said rigid deflectable member and said spring.

2. The improved micromechanical device of claim 1, said spring operable to prevent contact between said substrate and said rigid deflectable member.

3. The improved micromechanical device of claim 1, said rigid deflectable member capable of overcoming resistance by said spring and contacting said substrate.

4. The improved micromechanical device of claim 1, said spring comprising a leaf spring supported above said substrate.

5. The improved micromechanical device of claim 1, said spring comprising an elastic strip suspended above said substrate between two supports on said substrate.

6. The improved micromechanical device of claim 5, said elastic strip operable to deflect upon contact with said deflectable member.

7. The improved micromechanical device of claim 5, said elastic strip operable to twist upon contact with said deflectable member.

8. The improved micromechanical device of claim 5, said elastic strip comprising at least one thin section and at least one thick section, said thin section operable to twist upon contact between said elastic strip and said deflectable member.

9. The improved micromechanical device of claim 1, said rigid deflectable member comprising a mirror.

10. The improved micromechanical device of claim 1 further comprising at least one address electrode supported by said substrate and positioned to allow a voltage differential between said address electrode and said rigid deflectable member to deflect said rigid deflectable member.

11. The improved micromechanical device of claim 1, said at least one spring comprising at least one metal strip.

12. The improved micromechanical device of claim 1, said at least one spring comprising at least one leaf spring underneath said rigid deflectable member on each side of a rotational axis.

13. The improved micromechanical device of claim 1, said rigid deflectable member supported above said substrate by at least one torsion beam and operable to rotate in either of two directions about an axis formed by said torsion beam.

14. The improved micromechanical device of claim 13, said at least one spring comprising:

at least one spring on each side of said axis.

15. The improved micromechanical device of claim 13, said spring comprising a ring-shaped spring supported by at least two support structures.

16. The improved micromechanical device of claim 15, said ring-shaped spring further comprising at least one nub extending from said ring-shaped spring.

17. The improved micromechanical device of claim 15, said ring-shaped spring further comprising at least one thin section, said thin section operable to twist upon contact between said ring-shaped spring and said deflectable member.

18. The improved micromechanical device of claim 1, said rigid deflectable member comprising:

a torsion beam yoke;

a mirror support spacervia; and a mirror.

19. The improved micromechanical device of claim 18, wherein contact between said substrate and said torsion beam yoke limits deflection of said rigid deflectable member.

20. The improved micromechanical device of claim 18, wherein contact between said substrate and said mirror limits deflection of said rigid deflectable member.

21. A method of fabricating an improved micromechanical device, said method comprising the steps of:

fabricating at least one support structure on a substrate;

fabricating at least one spring spaced apart from said substrate and supported by said at least one support structure; and fabricating a deflectable member spaced apart from said substrate and said spring and supported by said at least one support structure, said deflectable member operable to move into contact with said spring and said spring operable to resist further movement of said deflectable member.

22. The method of claim 21, wherein said at least one spring is fabricated between said deflectable member and said substrate.

23. The method of claim 21, wherein said deflectable member and said at least one spring are fabricated on a common at least one support structure.

24. The method of claim 21, said step of fabricating at least one spring comprising the step of fabricating a metal strip extending away from said at least one support structure.

25. The method of claim 21, said step of fabricating at least one spring comprising the step of fabricating a metal strip suspended between at least two of said at least one support structure.

26. The method of claim 21, said step of fabricating at least one spring comprising the step of fabricating a metal strip suspended between at least two of said at least one support structure, said metal strip fabricated having a thin portion operable to twist upon contact between said metal strip and said deflectable member.

27. A display system comprising:

a light source capable of providing a light beam along a light path;

a micromirror device on said light path, said micromirror device comprised an array of micromirror elements, each said micromirror element comprised of a substrate;

a spring supported by said substrate; and a deflectable rigid member supported by said substrate and spaced apart from said spring, said deflectable rigid member comprising a mirror in said light path and operable to deflect toward said spring, said spring operable to resist said deflection of said deflectable rigid member upon contact between said spring and said deflectable rigid member;

a controller electrically connected to said micromirror device, said controller providing electrical signals to said micromirror device to cause said micromirror device to selectively deflect said deflectable rigid members thereby selectively reflecting light striking said deflectable rigid members along a projection light path; and projection optics located in said projection light path, said projection optics operable to focus light reflected by said micromirror device onto an image plane.

* * * * *